United States Patent

Dunn et al.

[11] Patent Number: 6,078,807
[45] Date of Patent: Jun. 20, 2000

[54] TELEPHONY FRAUD DETECTION USING VOICE RECOGNITION TECHNIQUES

[75] Inventors: James Michael Dunn, Ocean Ridge, Fla.; Alan George Ganek, Chappaqua, N.Y.; Edith Helen Stern, Boca Raton, Fla.; Barry Edward Willner, Briarcliff Manor, N.Y.

[73] Assignee: International Business Machines Corporation, Armonk, N.Y.

[21] Appl. No.: 08/920,025

[22] Filed: Aug. 26, 1997

[51] Int. Cl.[7] ....................................................... H01B 7/00
[52] U.S. Cl. ........................ 455/410; 455/411; 455/563; 455/565
[58] Field of Search ............................... 379/88.01, 88.02, 379/189; 455/410, 411, 403, 404, 565, 563; 704/231, 236, 240, 239, 272

[56] References Cited

U.S. PATENT DOCUMENTS

| | | | |
|---|---|---|---|
| 4,292,471 | 9/1981 | Kuhn et al. | 704/246 |
| 4,827,518 | 5/1989 | Feustel et al. | 704/246 |
| 5,054,083 | 10/1991 | Naik et al. | 379/189 |
| 5,432,816 | 7/1995 | Gozzo | 375/232 |
| 5,448,760 | 9/1995 | Frederick | 455/410 |
| 5,574,977 | 11/1996 | Joseph et al. | 455/450 |
| 5,590,242 | 12/1996 | Juang et al. | 704/245 |
| 5,608,784 | 3/1997 | Miller | 379/188 |
| 5,623,539 | 4/1997 | Bassenyemukasa et al. | 379/189 |
| 5,778,336 | 7/1998 | Chou et al. | 704/245 |

*Primary Examiner*—Reinhard J. Eisenzopf
*Assistant Examiner*—Lester G. Kincaid
*Attorney, Agent, or Firm*—Robert Lieber; Richard A. Tomlin

[57] ABSTRACT

A system/method is disclosed for screening telephone system callers, using speaker-dependent text-independent voice recognition, to either prevent excessive fraudulent use of certain telephone system lines (or radio channels) or to selectively restrict classes of service allowed for different users of a common line. The voice recognition process is configured to provide an extent of mismatch indication, between a voice sample taken from a caller immediately using the protected line (or channel) and a recorded reference voice sample, which indication corresponds to the probability that the instant caller is not the same as the person who provided the reference sample. The extent of mismatch indication is compared to a mismatch limit value which can be set to a different magnitude for each call. Different actions are taken depending upon whether the extent of mismatch indication is or is not larger than the limit value. In situations screening for potential fraudulent use of a line/channel, a mismatch indication larger than the set limit is considered representative of possible fraud and further action is taken to either immediately block continuation of the call or to acquire additional information from the caller which can be used to verify authorized usage.

11 Claims, 5 Drawing Sheets

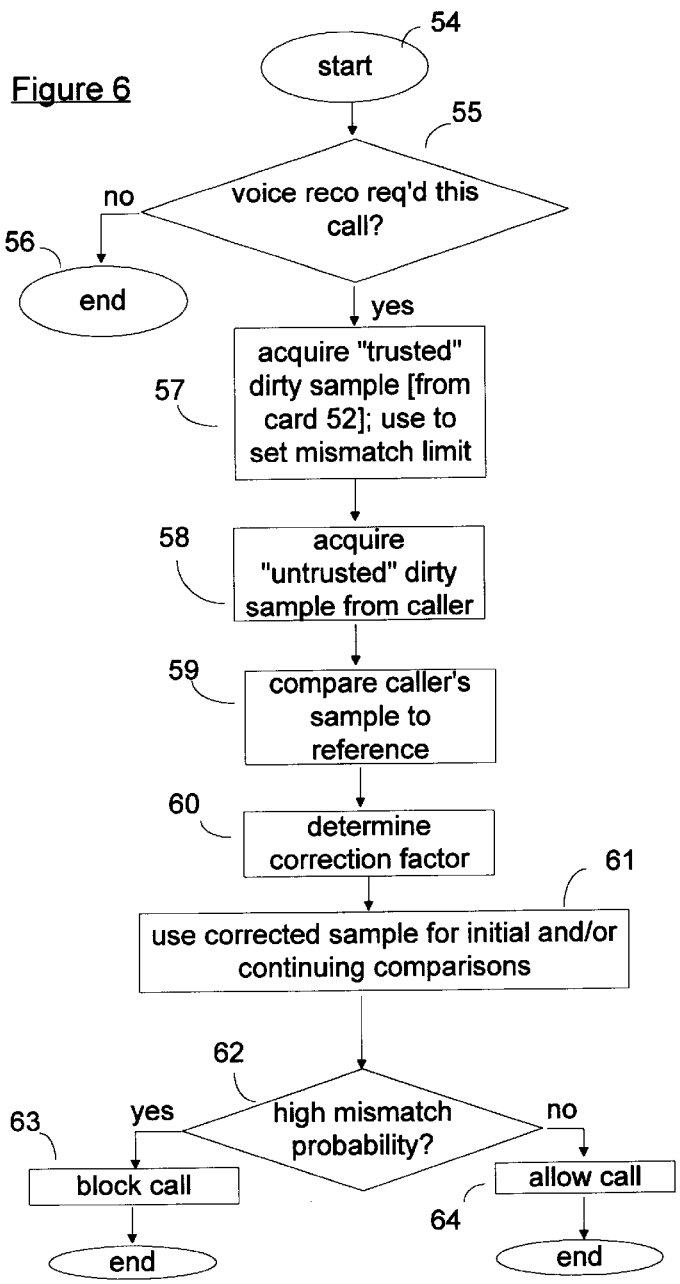
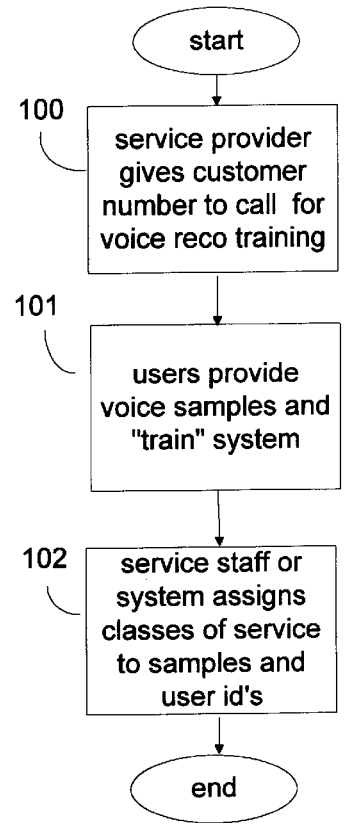

TELEPHONY FRAUD DETECTION USING VOICE RECOGNITION TECHNIQUES

CROSS-REFERENCES TO RELATED APPLICATIONS

1. Pending patent application Ser. No. 08/788,471 by S. H. Maes filed Jan. 28, 1997, which is titled Text Independent Speaker Recognition For Transparent Command Ambiguity Resolution And Continuous Access Control and assigned to International Business Machines Corporation. This application describes a voice recognition engine that operates on a speaker dependent but text independent basis; that is, it is useful to recognize a speaker even when the words spoken are different from those previously recorded. The disclosure of this patent application is incorporated herein as having possible ancillary relevance to providing functions needed by the system of the present invention.

2. Pending patent application Ser. No. 08/761,249 filed Feb. 3, 1997 for D. L. Acker et al, titled Multiservice Platform Architecture for Telephone Networks, and assigned to International Business Machines Corporation. This application describes a multiprocessor architecture for an intelligent peripheral (IP) component of a telephone network system conforming to advanced intelligent network (AIN) architectural principals now being widely adopted in public telephone networks.

BACKGROUND OF THE INVENTION

Fraudulent use of telephone services is known to be a significant problem for telephone companies and their legitimate customers[1].

[1] See paper titled IBM Fraud Management System, published on the Internet at http://www.telecom-media.hosting.ibm.com/telemedia/mccawibm.htm Solutions hitherto proposed involve a "positive" form of identification, the objective of which is to determine if a caller incurring charges is a legitimate user of the line or channel being charged. For instance, a caller's recitation of a prescribed phrase may be compared with a previously recorded sample of the same phrase spoken by a legitimate user of the line or channel to which a respective call is being charged.

The problem with such positive identification techniques is that they tend to be less than completely accurate, and thereby tend to give rise to "false errors" that inconvenience legitimate users. These techniques also tend to inconvenience legitimate callers in other ways (e.g. by requiring recitations of specific phrases, etc.).

SUMMARY OF THE INVENTION

We propose to develop a "negative probability" indication from the output of a speaker dependent text independent type of voice recognition engine (e.g. a voice recognition engine of the type disclosed by S. H. Maes in the above-referenced pending patent application Ser. No. 08/788,471 cross-referenced above), and to use that indication, together with a variable limit factor presently defined, as a basis for determining whether or not to interfere with a telephone call or a comparable function having variable value. The limit factor presently used is set as a function of the value of the telephone call or comparable function.

In respect to telephone calls, or comparable vocal communication functions, our overall objective is to be able to ascertain, with a variable degree of certainty adapted to the value of a call in progress, the probability that the caller is not a party or member of a group authorized to make that call. A particular application presently contemplated is that of providing a varied screening service, for telephone lines or channels within the public switched telephone network (PSTN), which would flag potential unauthorized use of respective lines/channels while presenting minimal interference to normal usage of respective lines/channels.

Where prior speaker identification systems would operate on a positive basis to determine with a high probability of correctness if a current speaker is authorized to use a given communication channel, our system is intended to operate on an inverse basis, and with a varying probability of correctness, to determine if a current speaker is not authorized to use the resource.

In contrast, our system uses outputs of a speaker dependent/text independent voice recognition "engine" (e.g. the engine disclosed in the cross-referenced patent application by Maes) as basic parameters of "match indication" (indications that speech currently occurring matches previously recorded speech), but derives therefrom indications of probability of mismatch. These derived indications are compared to mismatch limit factors that vary according to the circumstance of usage, and detection that a derived indication is greater than the mismatch limit factor represents indications of possible unauthorized usage that are useful presently as a basis for determining if further action is needed (e.g. direct interaction between a call carrier representative and the caller).

Thus, the limit factor we intend to use might vary in direct relation to the cost of a telephone call in progress, whereby indications of possible unauthorized usage would occur rarely for relatively cheap calls and more frequently for more expensive calls. In other words, our system would operate with relatively low discrimination in screening calls having relatively low value (or relatively low need for control) and with greater discrimination in screening calls having higher value (or greater need for control).

Accordingly, we intend to compare derived indications of probability of mismatch to mismatch limits that vary in relation to the potential consequences of failing to detect and deal with actual unauthorized uses. Thus, in calls incurring low charges, this limit would be set to provide a relatively low level of discrimination, and conversely in calls incurring high charges the limit would be set to provide a relatively high level of discrimination. For example, on a "low cost" or "low value" call where the subscriber's or user's voice sample(s) have female characteristics, the level of discrimination could be set low (i.e. the negative probability limit could be set low) so as to allow the call to continue for any caller with a voice having female characteristics but block continuation for any other callers. Conversely, in the same situation, in a high value call, the level could be set high (i.e. the negative probability limit could be set high) so as to allow the call to continue only for a caller whose voice closely matches the reference sample, and block all other calls.

This can be further enhanced by using it in conjunction with a secondary screening process established by the telephone carrier; e.g. a process resulting in applying the negative probability determination process only to telephone calls having more than a predetermined monetary value (for instance, only to "overseas" calls).

Furthermore, it is contemplated that when our system detects possible unauthorized use (i.e. when the differences between a speech sample of a current speaker and a pre-recorded reference sample exceed the differences tolerable within the assigned negative probability limit), we intend that other identification techniques be applied (for example, consideration of the RF signature of a cellular phone used by the speaker, a PIN number obtained from the speaker by a verbal prompt, etc.).

The expected result of this would be to drastically reduce interference with legitimate calls by the fraud (unauthorized use) detection process, as well as "false" rejections of legitimate calls by that process.

The foregoing and other advantages, benefits, objectives and features of the invention will be more fully understood from the following description.

BRIEF DESCRIPTION OF THE DRAWINGS

FIG. 6 is a flow diagram showing how the fraud detection process of FIG. 4 is modified to use the sample chip/card component of FIG. 5 to potentially improve detection results.

FIG. 8a is a flow diagram showing how a user of the (wire-connected) telephone in FIG. 7 subscribes to a service which applies a fraud detection technique protecting that user against telephone calls by others to destinations or regions not approved by the subscribing user.

DETAILED DESCRIPTION

Figure 1:
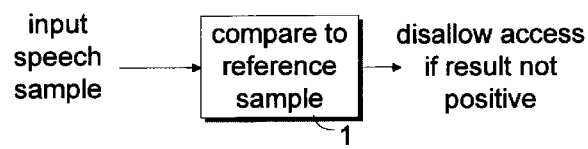
FIG. 1 illustrates a positive comparison technique of speaker identification used in prior art systems for detecting telephone fraud.

FIG. 1 illustrates the "positive" identification methodology of the prior art. As indicated at 1, a sample of actual speech is compared to a pre-recorded reference sample of speech provided by a particular person. If the comparison is not positive—meaning that if compared samples do not have a correlation corresponding to or greater than the correlation associated with a predetermined high probability that they are from the same speaker—access to a particular function is disallowed; for instance, in an application disclosed by Maes, operation of an automobile's ignition is blocked.

Figure 2:
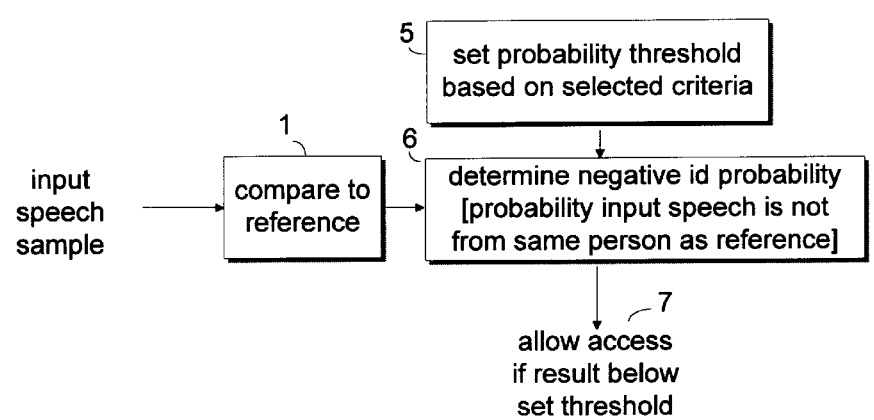
FIG. 2 is a schematic block diagram illustrating a technique presently proposed for detecting telephone fraud.

Our system, seen in FIG. 2, also seeks to make a comparison 1 between immediate and pre-recorded speech samples, but to derive therefrom indications of probability of mismatch and compare the latter to a mismatch probability limit 5 that is varied according to the value of the call (or other function) immediately being screened. This comparison to the mismatch limit is used as a basis 6 for determining if further action is required to block or interfere with the present call.

Thus, our mismatch limit serves as a negative screening threshold for a correlation process associated with the comparison, with the result of producing a "mismatch" indication only if the degree of miscorrelation exceeds the set limit, and thereby, as suggested at 7, indicating that access to a given resource should either be disallowed or further screened by examination of other factors. The given resource specifically contemplated for application of this technique, is a telephone line or channel in the PSTN, which has been subscribed to a use screening service for detection of fraudulent or other unauthorized uses.

Although not shown in this figure, it is presently contemplated that this type of unauthorized screening might be selectively applied or not applied depending upon the circumstances of a call (for example, for calls emanating from a residential line, it might be applied only to calls to "900" numbers and used for differentiating between certain adult members of a household authorized to make such calls and other individuals not authorized to do so).

Figure 3:
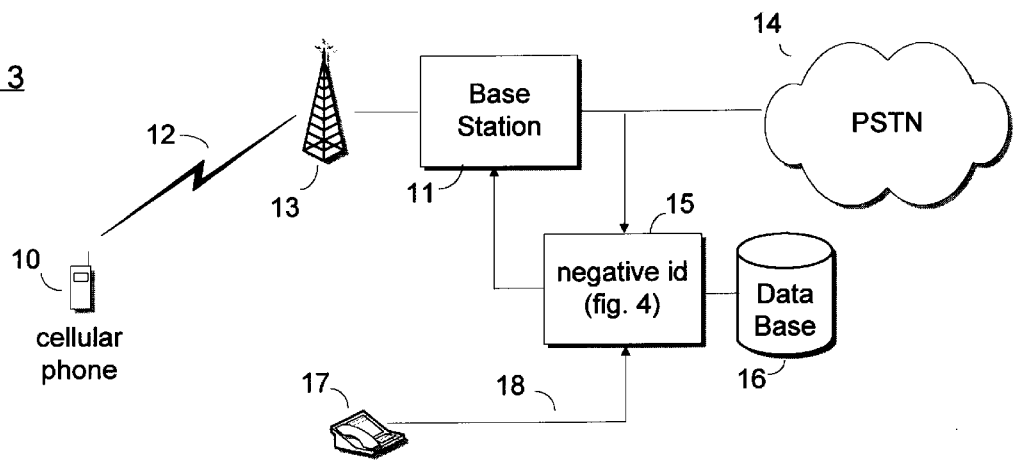
FIG. 3 schematically illustrates how the presently proposed technique can be applied to detection of fraudulent telephone calls originating from a cellular radio telephone device.

Use of the presently contemplated application in telephony is suggested in FIG. 3. Calling cellular unit 10 has radio linkage to base station 11 via tower 13. The base station is the interface between a user of unit 10 and the rest of the public switched telephone network (PSTN) shown schematically at 14. It is understood that the PSTN encompasses the aggregate world wide of all telephone facilities serving members of the public at large; i.e. all telephone call connection equipment (including exchanges handling public pay phones) accessible to the public, and therefore excluding connection equipment contained in private networks such as PBX's and Centrexes.

Associated with a (not-shown) PSTN telephone switching office local to the base station is a negative identification system 15 employing samples contained in a database 16. This identification system can be implemented in software employed in an intelligent processor (IP) component of a telephone system management network conforming to advanced intelligent network (AIN) architectural principles (refer to cross-referenced patent application for Acker et al cited above). As indicated in this figure, system 15 can also be used for speaker screening processes applicable to telephones such as 17 operating through fixed transmission line links 18 to the not-shown telephone switching office containing or utilizing the present identification system.

Figure 4:
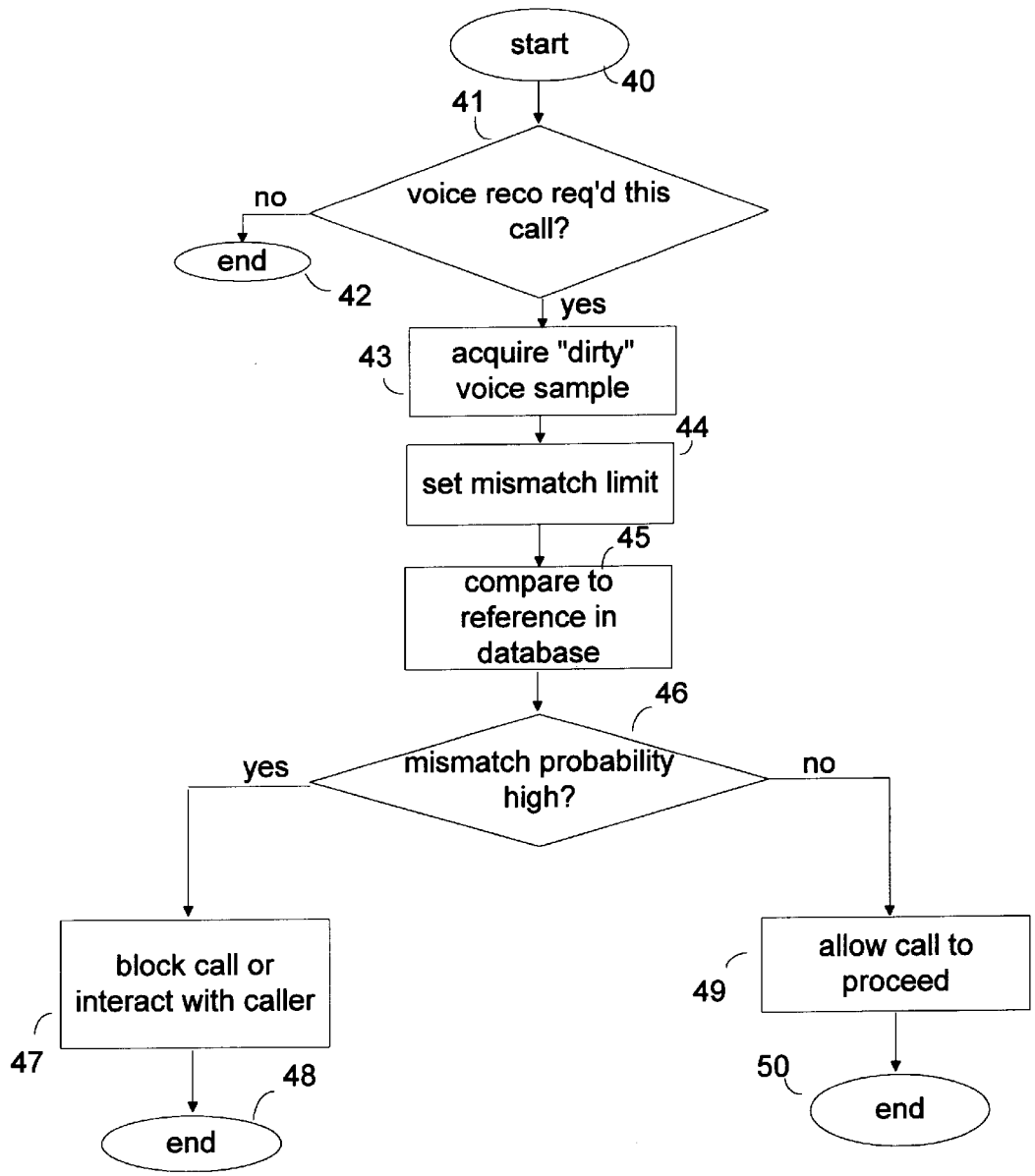
FIG. 4 is a flow diagram illustrating how the presently proposed technique is implemented in the telephone communication environment of FIG. 3.

Operation of the present identification system/speaker screening application is shown in the flowchart of FIG. 4. When a call is initiated (box 40), a telephone switching office local to the caller determines (decision 41) if the call requires speaker screening of the type presently contemplated. If such screening is not required, no further action is taken in that respect (block 42). Otherwise, telephone system call management intelligence serving the respective switching office (e.g. a software application executed on an intelligent processor/IP of the type described in the cross-referenced Acker et al patent application) oversees collection of a voice sample of the caller's speech (block 43). As suggested here the sample of the present caller's speech is considered "dirty" in the context that it is being taken through a telephone channel that may have noise or other distorting influences or with background acoustical noise in the caller's environment.

As shown at 44, a mismatch probability is set which (as previously noted) is related to the value of the call in progress. At 45, the dirty sample is compared to a pre-recorded "clean" sample of an authorized user's voice obtained in this instance from the telephone call management system's database. If there is more than one authorized user, clean/reference samples of each are pre-recorded and the current caller's sample is compared to each. The comparison(s) are designed to indicate the extent of mismatch between the compared samples; i.e. to provide an indication of the probability that the caller is not authorized to make this call. The result(s) of this/these comparison(s) is/are compared to the mismatch (negative probability) limit value set at 44, and the result of this limit comparison is tested at decision 46. If the mismatch factor obtained from comparison 45 exceeds the mismatch limit, further action is taken (47–48) to either immediately block continuation of the call or to interact further with the caller to obtain other proof of authorization to make the call. If the mismatch factor does not exceed the mismatch limit, the call is allowed to proceed without interference (49–50).

The mismatch limit can be determined by any criteria agreed upon by the telephone system carrier and the subscriber to the subject screening service. It can for instance depend upon the dialed destination of the call, the type of destination number dialed (e.g. it can be set differently for calls to numbers with a "900" area code prefix than for other calls), and so on. Furthermore, the limit is set to be directly related to the potential cost or value of the call, as indicated by this table:

TABLE 1

Relation between screening limit factor and user objective

| Urgency (importance of preventing unauthorized calls) | Negative Prob. Limit % |
|---|---|
| low/not too concerned | 70 |
| medium (moderate concern) | 80 |
| high (very concerned) | 90 |

Thus, a call involving low potential cost or concern would be blocked only if the caller's voice sample is radically different from the reference sample(s), whereas a call involving high potential cost or concern would be blocked if the caller's sample were just moderately different from the reference(s).

Figure 5:
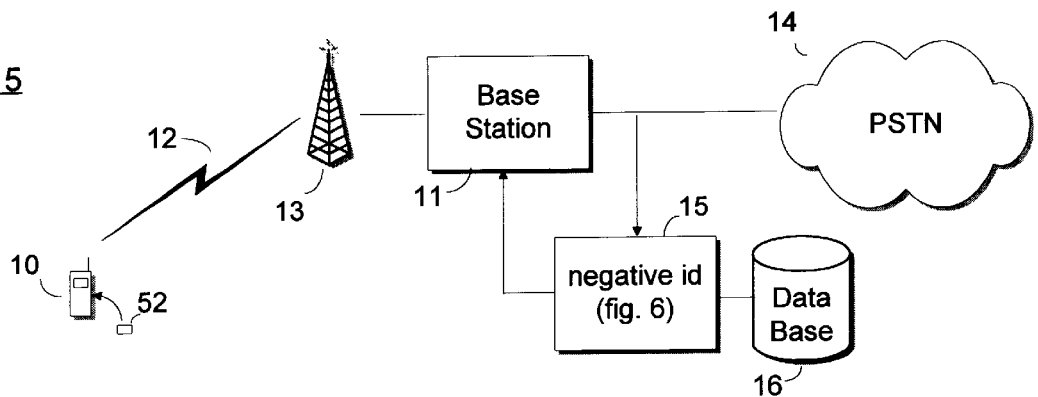
FIG. 5 schematically shows use of a voice sample chip/card component, in the cellular radio telephone of FIG. 3, to enhance the presently proposed fraud detection process in relation to telephone calls originating at such telephones.

FIG. 5 is similar to FIG. 3, but in this case the cellular/mobile phone 10 contains a voice sample card 52 that is similar to user identification cards used in existing Group Special Mobile (GSM) arrangements. However, in this application, the card carries not only the standard user identification (ID) information (in digital form) but also the same recorded voice sample as that recorded in the database of the voice recognition system. Now, at the beginning of a call, the sample on the card is sent to the center performing voice recognition processing for use as a "trusted dirty sample" of the authorized user's voice. This trusted dirty sample can be compared to the trusted clean sample stored in the voice recognition system's database, and used to establish an adjustment for electrical noise in the calling channel and/or acoustic noise in the caller's environment, that can be used to modify the comparison functions performed by the screening system (boxes 44–46, FIG. 4) so as to enhance the probability of correct mismatch screening determinations.

Since the trusted voice sample phrase on the card can be identical to the reference sample stored in the system database, distortions due to the radio channel and acoustic environment of the current call can be determined using conventional signal analysis techniques; e.g. techniques involving spectrum analysis and correlation. Results of such analysis can be used to derive a distortion correction factor for the current caller's voice sample sequence—in a manner similar to techniques used widely for noise cancellation in audio transmission and reproduction applications—whereby the noise image (in this case the difference between the trusted sample and reference sample or samples) is subtracted from the waveform to be corrected (in this case the reference voice sample or samples) to cancel noise (in this case environmental distortion).

The voice recognition process using the card sample as an adjustment factor is indicated in the flowchart of FIG. 6. Starting at 54, the determination 55 is made that the call does or does not require authorization screening by voice recognition. If the call does not require screening, the process terminates (box 56). If the call requires further screening, a "trusted dirty voice sample" is retrieved from the card 52, and used to set a mismatch limit applicable to this call (block 57). The screening system then acquires an "untrusted dirty sample" of the present caller's speech (block 58) and compares that to the database clean reference (block 59). As shown at 60, the trusted dirty sample is also used to correct the untrusted dirty sample, and the corrected sample is compared (or compared further) to the reference sample(s) as indicated at 61. The system then decides (decision 62) if the mismatch probability factor obtained from this comparison exceeds the mismatch probability limit set at 57. If it does, the call is blocked (63) or at least further action is taken to determine if the caller has authorization for this call. If the limit is not exceeded the call is allowed to proceed without interruption or intervention (64).

This ancillary use of a voice sample card in call screening can be especially useful in an analog transmission channel where noise is a more severe problem than in digital channels. It also can useful in a digital system if bits are "dropped" in the channel. It also can be useful where the caller is speaking through a transducing element or microphone sensitive to background acoustic noise, so as to enable the voice recognition system to allow for distortion due to that noise.

Another possible use of the sample card, either in addition to the above or in conjunction therewith, would be to divide the voice recognition processing function into "client" and "server" parts, whereby some of the voice recognition functions could be handled either on the card itself or at client equipment located near the card. This would offload some of the processing capacity requirements of the server (the telephone center performing the remainder of the voice recognition process). Other capabilities might include digitally encoding the card's voice sample for greater security in transmission over unsecured channels.

Another use of this card would be to apply its sample to screening of calling privileges on landline based telephones where fraud may not be a principal issue. In some business establishments for instance, telephones in various offices are assigned different "class" privileges (for example classes that allow and do not allow international calling), so that authorized occupants of respective offices can make calls within their assigned range of privilege. However, this presents a problem when an authorized occupant is out of his or her office and needs to make a privileged call that could be made from that office. In this situation, the present voice recognition process, with or without usage of a trusted card sample, could be used to allow for a single phone used by multiple callers to receive selective application of different calling privileges depending upon the caller.

Figure 7:
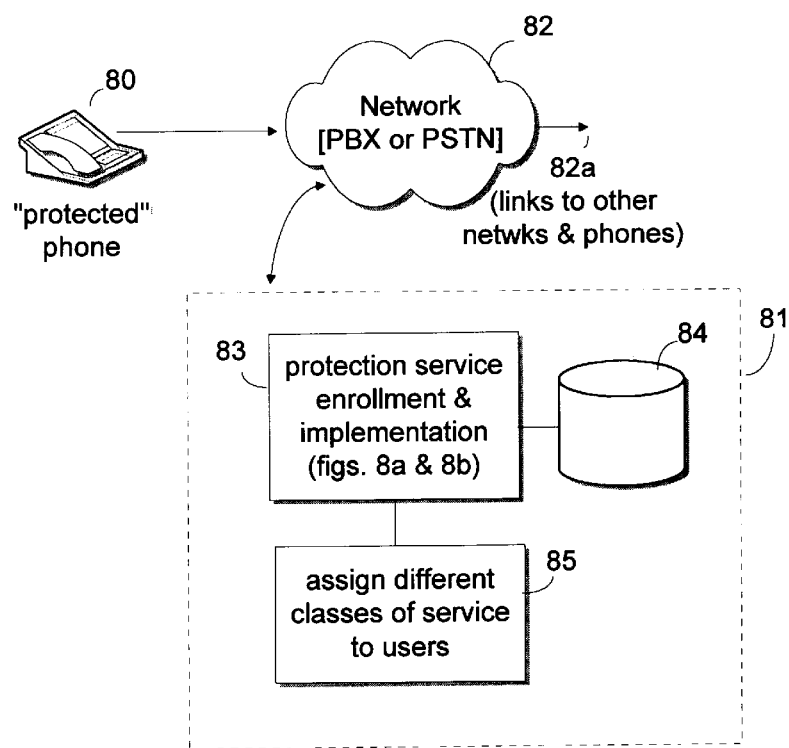
FIG. 7 schematically illustrates how the presently proposed fraud detection technique can be usefully applied to telephones having fixed wire connections to a base network (PBX or PSTN) in which the technique is applied.

This application is suggested in FIG. 7, where land-based phone 80, operating through processing center 81 in telephone network 82, needs to be protected by the processing center against certain classes of use by other than a select group of individuals. Processing center 81 can be either a private network within a business enterprise (e.g. a PBX) or part of the PSTN. Telephone 80 can be housed within a business enterprise or a residence.

An application in a business enterprise might be as follows. Assume telephone 80 is located on a desk in a public area of a business establishment, and that it is necessary to exclude all but a small class of employees from making e.g. overseas or other long distance calls from that telephone. Thus, it might be necessary to exclude the normal occupant of the desk and other individuals (other employees, customers, etc.) from making such calls from that telephone, while allowing a select group of other individuals (e.g. management and middle management employees) to make such calls from the same telephone. In this situation, the presently contemplated voice recognition screening process could be applied to such calls, and provide a basis for selective exclusion of all but the select group.

Where the "protected" telephone 80 is in a residence, it could be necessary to prevent minor children and others from making certain calls (e.g. long distance calls, and calls to telephone numbers with "900" type prefixes), while permitting a father and mother to make such calls from the same telephone. Here also the presently contemplated voice recognition process can be used to make the needed discriminations.

Accordingly, processing center 81 is adapted to perform a screening process involving voice recognition, relative to telephone 80, whereby only members of a select group of individuals would be allowed to make certain privileged calls, and all other users of the telephone would be would be blocked from making the privileged calls. This screening process, described below with reference to FIGS. 8*a* and 8*b*, differs in certain respects from screening processes described earlier for wireless telephones. For both wireless and landwire based applications, the telephone instrument is known. In the wireless application it is necessary to distinguish the telephone's location relative to a site of "normal" usage (e.g. to find and retrieve the applicable database references), and the type of call being made, before applying the screening process. In landline based applications, the telephone's location and the site of its applicable voice reference database are fixed/known, but it is necessary to distinguish if a user making a "protected" call is in the class permitted to make such calls.

Figure 8B:
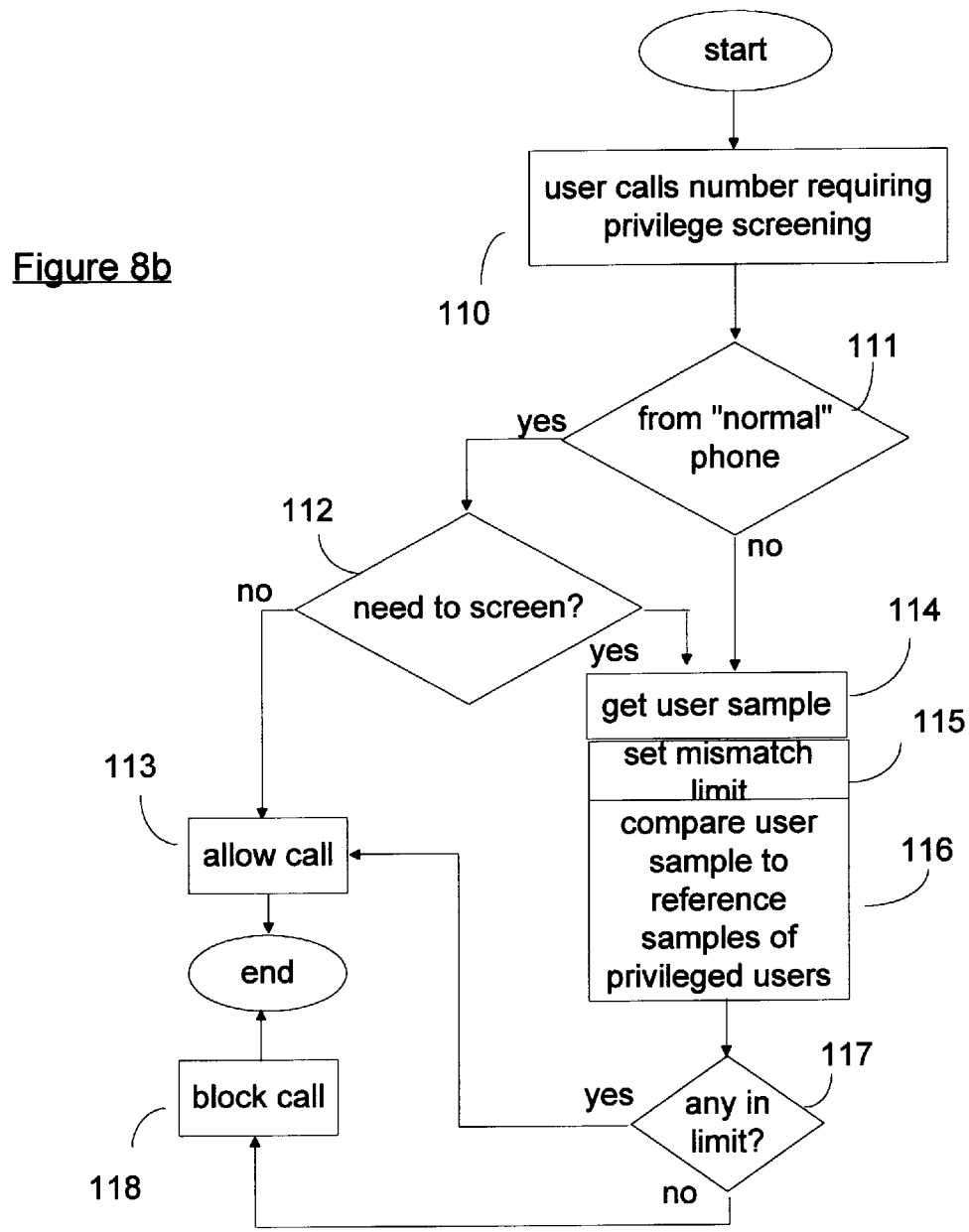
FIG. 8b is a flow diagram showing how the fraud detection service offered to the subscriber in FIG. 8a is implemented to provide the respective fraud prevention service associated with the subscription.

Accordingly, it is understood that a screening process relative to a landline based telephone is evoked when a call from that telephone/line is made to a telephone number that is subject to use only by a predefined group of individuals whose reference voice samples have been stored in a database associated with the screening process. FIG. 8*a* is used to explain a preferred process by which a suitable reference database of voice samples is acquired, and FIG. 8*b* is used to explain how that database is used in a screening process.

To allow for acquisition of suitable reference voice samples, the service provider provides a special "training" telephone number to all individuals that are members of select groups entitled to make "screenable" (protected) calls (block 100, FIG. 8*a*). There may be plural such groups, each having different membership and different classes of permitted calls. Identities of individual callers to the training number are verified, and authorized individuals are prompted to repeatedly speak defined phrases to train the system to specifically recognize their speech (box 101) in a text-independent manner (refer e.g. to the system described by S. H. Maes in the copending patent application previously cross-referenced). In this training phase, the verification of identities may involve ascertaining a caller's full name, residential address, and certain other information that should be unique to a member of a select group, and checking that information against reference data previously supplied by a subscriber to the service.

The training process specifically involves capturing sufficient voice samples from each authorized user to allow recognition assessment commensurate with the process of the specific recognition engine being used. For example, note that the recognition engine described in the incorporated reference by Maes suggests that approximately 10 seconds of speech will produce about 65 clustered feature vectors suitable for his preferred method of (positive) voice analysis.

Upon completion of the training sequence, the system or staff administering this service associates the caller's recorded/reference voice samples and associated identifying information to classes of protected calls that the service subscriber has designated as permitted for that caller (box 102, FIG. 8*a*).

FIG. 8*b* shows how the reference samples and identifying information are used in subsequent screening processes. When a call is made requiring privilege screening (block 110), the system responsible for screening determines (decision 111) if the call is from a telephone which normally would be used only by one person (e.g. from a telephone in a business executive's private office, etc.). If the call is from such a telephone, the system determines if the call still needs voice screening (decision 112); e.g. to prevent unauthorized use of the phone by its normal user or to prevent authorized use by other than the normal user. If further screening is not required the call is allowed to proceed without such (box 113). If further screening is required, functions shown in blocks 114–117 are performed in succession.

In function 114, a "dirty" sample of the caller's speech is acquired. In function 115, the a mismatch limit is set that is related to the class of privilege or protection assigned to the called number. In function 116, the dirty sample is compared to the reference samples of all users permitted to call the presently called number. In decision function 117, it is determined if any of the comparison results is "within" the mismatch limit set at 115; i.e. it is determined if the caller's voice is a virtual match to any of the references. If the comparison results include a virtual match, the call is allowed to proceed without further screening action (box 113), whereas if the results do not include a virtual match action 118 is taken to either block the call immediately or require the caller to provide additional information to enable the system to verify his or her identity.

It should be readily apparent that functions used by this invention can be implemented either by computer software or specific hardware without affecting the manner of operation of the invention. Accordingly we claim the following.

What is claimed is:

1. A system for controlling access to a resource comprising:

means for storing a reference voice sample of an authorized user of said resource;

means for obtaining a "dirty" voice sample from a person seeking access to said resource;

means for applying a voice recognition process to said dirty and reference voice samples, to derive an indication therefrom of the extent of mismatch between said samples;

means for setting a variable mismatch limit related specifically to conditions pertaining to allowable uses of said resource;

means for determining if said derived mismatch indication exceeds said related mismatch limit; a determination that said derived mismatch indication exceeds said related mismatch limit being considered indicative that the person seeking access is probably not said authorized user associated with said reference voice sample, and a determination that said derived mismatch indication does not exceed said related mismatch limit being considered indicative that the person seeking access could be said authorized user;

means for utilizing said determination that said derived mismatch indication does not exceed said related mismatch limit for permitting said person seeking access to said resource to have access to said resource; and means for utilizing said determination that said derived mismatch indication exceeds said related mismatch limit for initiating further action to control access to said resource by said person seeking access to said resource.

2. An access controlling system in accordance with claim 1 wherein said resource is an information transmission channel in a communication network.

3. An access controlling system in accordance with claim 2 wherein said resource is a voice transmission channel in a telephone communication network.

4. An access controlling system in accordance with claim 1 wherein said means for applying a said voice recognition process to said samples utilizes a voice recognition process that is speaker-dependent but text-independent, wherein text-independent means independent of words contained in said dirty and reference samples.

5. An access controlling system in accordance with claim 1 wherein:

said means for storing a reference voice sample of an authorized user is adapted to store plural reference voice samples representing voices of plural different authorized users of said resource;

said means for applying said voice recognition process to said samples applies said process effectively to said dirty voice sample and each of said reference voice samples so as to effectively compare said dirty voice sample to each of said reference voice samples, and to derive indications of the extent of mismatch indications between said dirty sample and each of said reference samples;

said means for determining is effective to determine if at least one of said derived indications does not exceed said related mismatch limit; and said means for permitting said person seeking access to have said access is responsive to a said determination that at least one of said derived mismatch indications does not exceed said related limit to permit said person to have unobstructed access to said resource.

6. An access controlling system in accordance with claim 5 wherein said resource is a voice channel of a telephone communication network.

7. An access controlling system in accordance with claim 1 comprising:

means for obtaining a trusted dirty voice sample which is subject to noise in the environment of said person seeking access to said resource, but otherwise should be identical to said reference voice sample if said person seeking access is using said access controlling system properly;

means for using said trusted dirty sample to effectively adjust said compared samples to correct for said noise in said environment.

8. An access controlling system in accordance with claim 7 wherein:

said resource is a telephone communication network;

said telephone network includes a radio channel through which said person seeking access is able to access said telephone communication network via a radio-based telephone; and said trusted dirty voice sample is stored at said radio telephone and transmitted through said radio channel in association with operation of said radio telephone.

9. An access controlling system in accordance with claim 8 wherein said trusted dirty voice sample is stored within said radio telephone.

10. An access controlling system in accordance with claim 1 wherein said mismatch limits are subject to variations, dependent upon circumstances of usage of said resource, whereby in at least one circumstance of usage there is a distinct possibility that access to said resource could be granted both to said person providing said reference sample and to a person other than said person providing said reference sample.

11. A system for controlling access to a voice channel in a telephone communication network comprising:

means for storing a reference voice sample of an authorized user of said voice channel;

means for obtaining a "dirty" voice sample from a person seeking access to said voice channel;

means for applying a voice recognition process to said dirty and reference voice samples, to derive an indication therefrom of the extent of mismatch between said samples;

means for setting a variable mismatch limit related specifically to said derived mismatch indication;

means for determining if said derived mismatch indication exceeds said related mismatch limit; a determination that said derived mismatch indication exceeds said related mismatch limit being considered indicative that the person seeking access is probably not the same as said authorized user associated with said reference voice sample, and a determination that said derived mismatch indication does not exceed said related mismatch limit being considered indicative that the person seeking access may be said authorized user;

means for utilizing a said determination that said derived mismatch indication does not exceed said related mismatch limit for permitting said person seeking access to said resource to have access to said resource;

means for utilizing a said determination that said derived mismatch indication exceeds said related mismatch limit for taking further action to control access to said resource by said person seeking access to said resource;

said means for storing a reference voice sample of an authorized user is adapted to store plural reference voice samples representing voices of plural different authorized users of said voice channel;

said means for applying said voice recognition process to said samples applies said process effectively to said dirty voice sample and each of said reference voice samples so as to effectively compare said dirty voice sample to each of said reference voice samples, and to derive indications of the extent of mismatch indications between said dirty sample and each of said reference samples;

said means for determining is effective to determine if at least one of said derived indications does not exceed said related mismatch limit; and said means for permitting said person seeking access to have said access is responsive to a said determination that at least one of said derived mismatch indications does not exceed said related limit to permit said person to have unobstructed access to said resource; and wherein;

said plural reference voice samples stored by said means for storing constitute reference voice samples of plural groups of authorized users of said voice channel of said telephone network; said groups having different access privileges to said voice channel and including at least a first group entitled to a first class of access to said voice channel and a second group entitled to a second class of access to said voice channel that is different from said first class of access;

said means for determining is effective to compare said dirty voice sample to all of said reference voice samples of said first and second groups of users, and produce an extent of mismatch indication relative to each of said groups that is indicative of the smallest extent of mismatch between the dirty sample and the reference samples in each group; and said means for utilizing said determinations are effective to determine which reference group is least mismatched to the dirty voice sample, and to permit the caller associated with the dirty sample to have a class of access to said voice channel that corresponds to the class of access assigned to the group having the smallest extent of mismatch to the dirty sample.

\* \* \* \* \*